(12) United States Patent
Krishnamoorthi et al.

(10) Patent No.: US 12,508,912 B2
(45) Date of Patent: Dec. 30, 2025

(54) SYSTEM AND METHOD FOR DISCHARGING A CAPACITOR USING AN AUXILIARY LEG IN AN INVERTER

(71) Applicant: Cummins Inc., Columbus, IN (US)

(72) Inventors: Santhosh Krishnamoorthi, Indianapolis, IN (US); Gary L. Parker, Columbus, IN (US); Bradford K. Palmer, Ham Lake, MN (US); Dakshina S. Murthy-Bellur, Plymouth, MN (US); Minyu Cai, Maplewood, MN (US)

(73) Assignee: Cummins Inc., Columbus, IN (US)

( * ) Notice: Subject to any disclaimer, the term of this patent is extended or adjusted under 35 U.S.C. 154(b) by 70 days.

(21) Appl. No.: 18/030,607

(22) PCT Filed: Sep. 30, 2021

(86) PCT No.: PCT/US2021/052752
§ 371 (c)(1),
(2) Date: Apr. 6, 2023

(87) PCT Pub. No.: WO2022/086686
PCT Pub. Date: Apr. 28, 2022

(65) Prior Publication Data
US 2023/0364997 A1    Nov. 16, 2023

Related U.S. Application Data

(60) Provisional application No. 63/093,534, filed on Oct. 19, 2020.

(51) Int. Cl.
*B60L 3/00*      (2019.01)
*B60L 50/51*     (2019.01)
(Continued)

(52) U.S. Cl.
CPC ........... *B60L 3/003* (2013.01); *B60L 50/51* (2019.02); *H02M 1/322* (2021.05); *H02M 7/53871* (2013.01); *B60L 2210/42* (2013.01)

(58) Field of Classification Search
CPC .......... B60L 3/003; B60L 50/51; H02M 1/322
(Continued)

(56) References Cited

U.S. PATENT DOCUMENTS 8,264,204 B2   9/2012   Nagaoka
8,324,691 B2   12/2012  Hirose
(Continued)

FOREIGN PATENT DOCUMENTS

JP   2009027831 A   2/2009
JP   2013059192 A   3/2013
(Continued)

OTHER PUBLICATIONS

International Search Report and Written Opinion for International patent application No. PCT/US2021/052752, filed Sep. 30, 2021, mailed Dec. 29, 2021.

*Primary Examiner* — Daniel Kessie
*Assistant Examiner* — Dru M Parries
(74) *Attorney, Agent, or Firm* — Faegre Drinker Biddle & Reath LLP (57) ABSTRACT

An inverter system is provided such that the system includes a direct-current (DC) voltage supply, an inverter electrically coupled with the DC voltage supply, an electric machine electrically coupled with the inverter, and a controller coupled with the inverter. The inverter has a plurality of legs, each leg including two switches operating complementary to each other, an auxiliary leg having a pair of auxiliary switches, and a resistor coupled parallel to one of the auxiliary switches. A controller is coupled with the inverter and is operative to activate or deactivate the auxiliary leg of (Continued)

the inverter. The controller activates the auxiliary leg to discharge the capacitor or the DC bus through the resistor.

13 Claims, 10 Drawing Sheets (51) Int. Cl.
  *H02M 1/32* (2007.01)
  *H02M 7/5387* (2007.01)
(58) Field of Classification Search
  USPC .......................................................... 307/10.1
  See application file for complete search history.

(56) References Cited

U.S. PATENT DOCUMENTS

| | | |
|---|---|---|
| 9,048,667 B2 | 6/2015 | Nagaoka |
| 9,260,019 B2 | 2/2016 | Sakata |
| 2006/0033453 A1 | 2/2006 | Cao |
| 2015/0194909 A1 | 7/2015 | Pahlevaninezhad |
| 2015/0349661 A1 | 12/2015 | Kunin et al. |
| 2017/0214309 A1 | 7/2017 | Yoscovich et al. |
| 2018/0079315 A1* | 3/2018 | Yang ................... H02M 7/5387 |
| 2018/0236874 A1 | 8/2018 | Tsukada et al. |
| 2020/0395881 A1* | 12/2020 | Hanioka ............... H02P 27/085 |

FOREIGN PATENT DOCUMENTS

| | | | | |
|---|---|---|---|---|
| WO | WO-2014118625 A1 * | 8/2014 | ............. | G01K 3/005 |
| WO | WO-2020091750 A1 * | 5/2020 | ............. | B60K 6/387 |

* cited by examiner

SYSTEM AND METHOD FOR DISCHARGING A CAPACITOR USING AN AUXILIARY LEG IN AN INVERTER

CROSS-REFERENCE TO RELATED APPLICATIONS

This application is a U.S. national stage of and claims priority to International Patent Application No. PCT/US2021/052752, filed Sep. 30, 2021, which claims priority U.S. Provisional Application No. 63/093,534, filed on Oct. 19, 2020, both of which are incorporated herein by reference in their entirety.

FIELD OF THE DISCLOSURE

The present disclosure generally relates to inverters, more specifically to circuit systems with inverters that transfer electrical energy between a power source and a load.

BACKGROUND OF THE DISCLOSURE

An inverter converts electrical energy between direct current (DC) and alternating current (AC) forms. In an electric system, the inverter can connect to an electric machine or any other three-phase load and source. Three-phase DC/AC voltage source inverters are used in applications such as motor drives, active filters, and unified power flow controllers in power systems and uninterrupted power supplies to generate controllable frequency and AC voltage magnitudes using pulse width modulation (PWM) strategies. The standard three-phase inverter shown in FIG. 1 has six power switches ($S_1$ through $S_6$), the switching of which depends on the PWM strategy being implemented.

Figure 1:
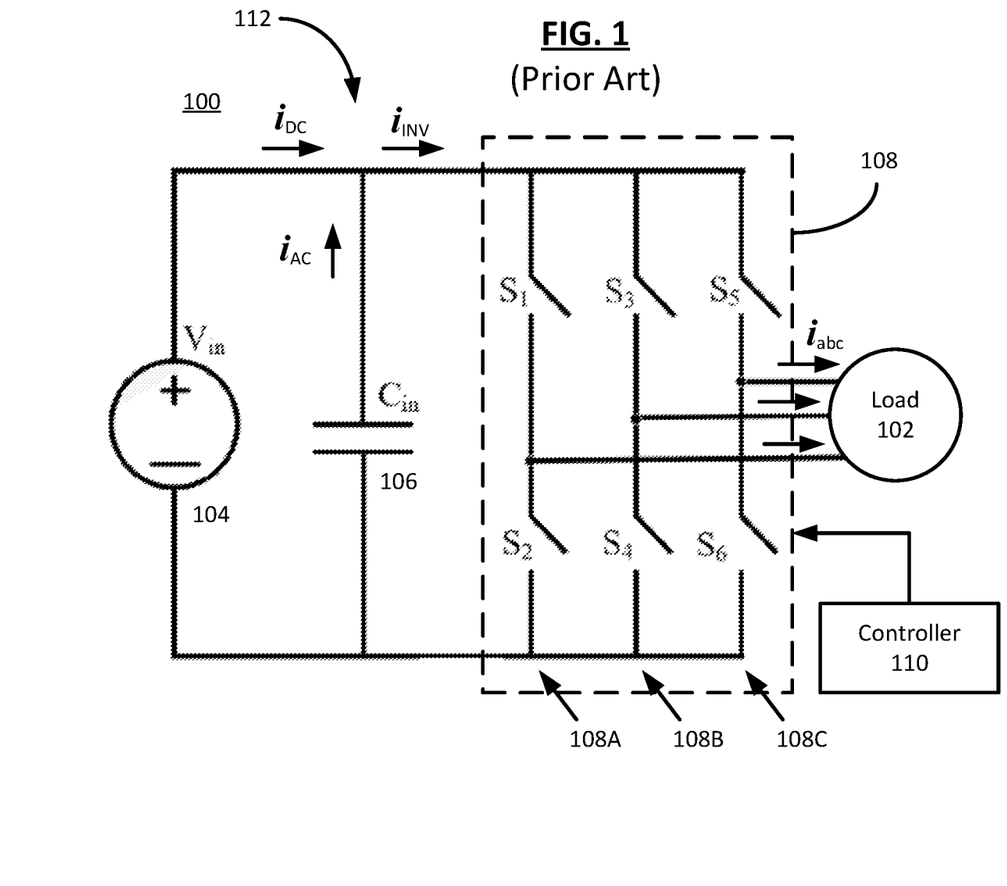
FIG. 1 is a schematic diagram of an inverter system as known in the art.

Shown in FIG. 1 is an inverter system 100 where a load 102 is connected to a DC voltage source or high-voltage DC source 104 and a capacitor 106 through a three-phase inverter 108. The inverter 108 includes the switches $S_1$ through $S_6$ to form a three-phase inverter where the control signal for each power switch is generated by a controller 110. $S_1$ and $S_2$ belong in the first leg 108A, $S_3$ and $S_4$ belong in the second leg 108B, and $S_5$ and $S_6$ belong in the third leg 108C of the inverter 108.

Three types of current pass through the system, one being a DC current $i_{DC}$ passing through the DC voltage source 104, the other being $i_{AC}$ passing through the capacitor 106, and lastly the inverter current $i_{INV}$ which is the sum of the other two currents $i_{DC}$ and $i_{AC}$. The inverter output currents $i_a$, $i_b$, $i_c$ (shown collectively as $i_{abc}$ in FIG. 1) are the currents passing through the load 102 when the appropriate switches are activated. For example, the switches are controlled such that at any one time, only one switch in each leg may be closed and the other switch must remain open. Depending on which switches are opened or closed, the current will flow in the direction indicated by the switches, or there may not be any current flow at all when the circuit is an open circuit.

In the inverter system 100, a DC bus 112 is electrically coupled with the capacitor 106. After the capacitor 106 is disconnected from the DC bus 112, it will discharge gradually due to its internal resistor. However, faster discharge or active discharge is always required upon shutdown of the inverter system operating using particularly high voltage DC bus for safety reasons. Methods and systems which improve the functionality of the legs, and therefore the inverter overall, need to be contemplated. In addition, there is a need to have a mechanism besides mechanical brake to prevent the battery from being overcharged.

SUMMARY OF THE DISCLOSURE

The present disclosure provides an inverter or an inverter system that includes a direct-current (DC) voltage supply, an inverter electrically coupled with the DC voltage supply, an electric machine electrically coupled with the inverter, and a controller coupled with the inverter. The inverter has a plurality of legs, each leg including two switches operating complementary to each other, an auxiliary leg having a pair of auxiliary switches, and a resistor coupled parallel to one of the auxiliary switches. A controller is coupled with the inverter and is operative to activate or deactivate the auxiliary leg of the inverter. The auxiliary leg is controlled to be activated or deactivated by mode commands or requests from the system (for example, shutdown command of the inverter system or another system such as a vehicle in which the inverter system is implemented) such that activating the auxiliary leg enables the system to discharge the capacitor or the DC bus through the resistor.

In some examples, the controller determines to activate the auxiliary leg based on detecting an untoward event. In some examples, detecting the untoward event includes receiving a voltage measurement or feedback indicating a voltage drop across the capacitor is greater than an upper voltage threshold value. In some examples, upon shutdown of the inverter system, the DC bus or the DC capacitor is discharged to bring the voltage to safe levels. Faster discharge or active discharge in some examples is required upon shutdown of the inverter system operating using particularly high voltage DC bus for safety reasons. The controller determines to deactivate the auxiliary leg based on detecting an end of the untoward event. In some examples, detecting the end of the untoward event includes receiving a voltage measurement or feedback indicating a voltage drop across the capacitor is less than a lower voltage threshold value. In some examples, detecting the end of the untoward event includes receiving a current feedback indicating a current in the resistor is less than a lower current threshold value.

In some examples, the inverter includes a plurality of auxiliary legs, each including a corresponding pair of auxiliary switches and at least one corresponding resistor coupled parallel to one of the auxiliary switches. In some examples, the inverter is a three-phase inverter, the plurality of legs are three (3) legs, and the auxiliary leg is a fourth ($4^{th}$) leg. In some examples, the inverter is a six-phase inverter, the plurality of legs are six (6) legs, and the auxiliary leg is a seventh ($7^{th}$) leg. In some examples, there are a plurality of auxiliary legs, such as a $7^{th}$ leg and an eighth ($8^{th}$) leg, etc.

The present disclosure also provides methods of operating an inverter or an inverter system with a direct-current (DC) bus, a capacitor electrically coupled with the DC bus, and an inverter electrically coupled with the capacitor or the DC bus. The inverter has a plurality of legs, each leg including two switches operating complementary to each other, and an auxiliary leg having a pair of auxiliary switches and at least one corresponding resistor coupled in parallel to one of the auxiliary switches. The inverter system also includes a controller coupled with the inverter and operative to activate or deactivate the auxiliary leg of the inverter.

In some examples, determining to activate the auxiliary leg is based on detecting an untoward event, such as a shutdown command for the inverter system or for another system (such as a vehicle) in which the inverter system is implemented. In some examples, upon shutdown of the inverter system, the DC bus or the DC capacitor is discharged to bring the voltage to safe levels. The auxiliary leg is controlled to be activated or deactivated by mode commands or requests from the system. In some examples, detecting the untoward event includes receiving a voltage measurement or feedback indicating a voltage drop across the capacitor is greater than an upper voltage threshold value. The auxiliary leg is deactivated based on detecting an end of the untoward event, as determined by the controller. In some examples, detecting the end of the untoward event includes receiving a voltage measurement or feedback indicating a voltage drop across the capacitor is less than a lower voltage threshold value. In some examples, detecting the end of the untoward event includes receiving a current feedback indicating a current in the resistor is less than a lower current threshold value.

In some examples, the inverter has a plurality of auxiliary legs, each including a corresponding auxiliary switch and at least one corresponding resistor. In some examples, the inverter is a three-phase inverter, the plurality of legs are three (3) legs, and the auxiliary leg is a fourth ($4^{th}$) leg. In some examples, the inverter is a six-phase inverter, the plurality of legs are six (6) legs, and the auxiliary leg is a seventh ($7^{th}$) leg. In some examples, there are a plurality of auxiliary legs.

The present disclosure also provides an inverter with a plurality of legs, each leg including two switches operating complementary to each other, and a pair of auxiliary switches and at least one corresponding resistor coupled in parallel to one of the auxiliary switches. The inverter can activate or deactivate the auxiliary leg in response to a signal transmitted from a controller coupled with the inverter. In some examples, upon shutdown of the inverter, the DC bus or the DC capacitor is discharged to bring the voltage to safe levels. The auxiliary leg is controlled to be activated or deactivated by mode commands or requests from the system. In some examples, the controller activates the auxiliary leg in response to receiving a voltage measurement or feedback indicating a voltage drop across the capacitor is greater than an upper voltage threshold value. The controller deactivates the auxiliary leg in response to detecting an end of the untoward event. The controller, in some examples, deactivates the auxiliary leg in response to receiving a voltage measurement or feedback indicating a voltage drop across the capacitor is less than a lower voltage threshold value. In some examples, the controller deactivates the auxiliary leg in response to receiving a current feedback indicating a current in the resistor is less than a lower current threshold value.

While multiple embodiments are disclosed, still other embodiments of the present disclosure will become apparent to those skilled in the art from the following detailed description, which shows and describes illustrative embodiments of the present disclosure. Accordingly, the drawings and detailed description are to be regarded as illustrative in nature and not restrictive.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein.

While the present disclosure is amenable to various modifications and alternative forms, specific embodiments have been shown by way of example in the drawings and are described in detail below. The intention, however, is not to limit the present disclosure to the particular embodiments described. On the contrary, the present disclosure is intended to cover all modifications, equivalents, and alternatives falling within the scope of the present disclosure as defined by the appended claims.

DETAILED DESCRIPTION OF THE DISCLOSURE

In the following detailed description, reference is made to the accompanying drawings which form a part hereof, and in which is shown by way of illustration specific embodiments in which the present disclosure is practiced. These embodiments are described in sufficient detail to enable those skilled in the art to practice the present disclosure, and it is to be understood that other embodiments can be utilized and that structural changes can be made without departing from the scope of the present disclosure. Therefore, the following detailed description is not to be taken in a limiting sense, and the scope of the present disclosure is defined by the appended claims and their equivalents.

Figure 2:
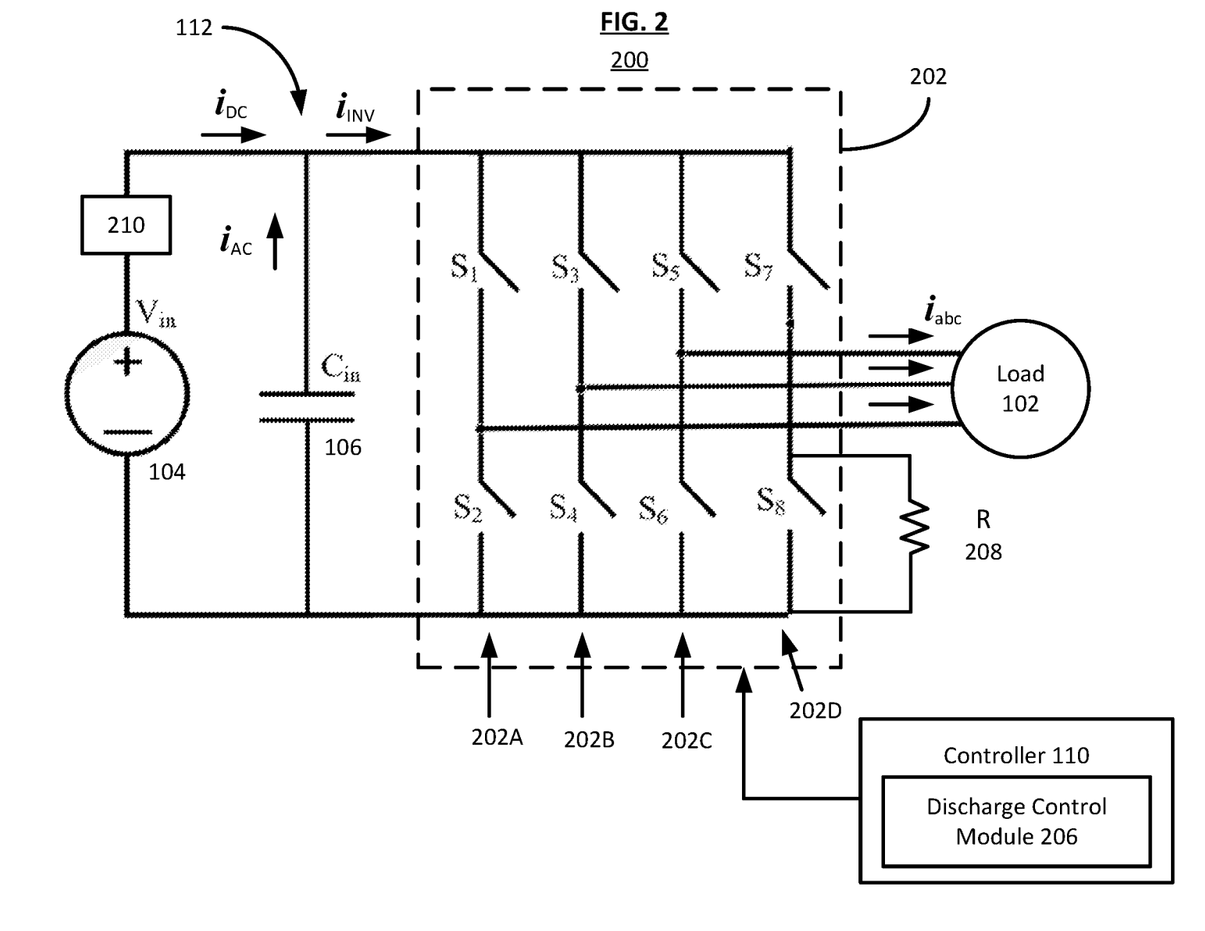
FIG. 2 is a schematic diagram of an inverter system in accordance with embodiments of the present disclosure.

FIG. 2 shows an inverter system 200 according to the present disclosure which includes an inverter 202 with four legs (202A, 202B, 202C, and 202D) where, in addition to the first three legs 202A through 202C having switches $S_1$ through $S_6$, there is a fourth leg 202D (referred to herein as an additional or auxiliary leg) with a pair of additional or auxiliary switches $S_7$ and $S_8$, and a discharge or braking resistor 208 electrically coupled parallel to one of the auxiliary switches, in this case the switch $S_8$. In each leg, the switches operate complementary to each other.

In some examples, the auxiliary leg 202D may be used for dynamic braking for the traction drive of a vehicle, or as regulator for the DC bus 112 or capacitor 106. In some examples, the auxiliary leg 202D is used to regulate voltage to protect a DC voltage/power source (e.g., the DC voltage source 104) from overcharging the DC bus 112 or the capacitor 106 by controlling a charging current or a DC voltage. The legs of the inverter 202 are controlled by a controller 110, which may be a suitable processing unit such as a microprocessor, central processing unit (CPU), system on a chip (SoC), etc. The inverter system 200 also includes a voltage source contactor 210 which controls whether the voltage source 104 is to be electrically coupled with the DC bus 112 and/or the capacitor 106. In some examples, the contactor 210 includes an input and an output, between which is a coil which draws current and allows switching high-current loads, such as those used in aircrafts. When energized, the coil in the contactor 210 creates a magnetic field to pull a mechanical switch closed.

The controller 110 includes a discharge control module 206 which controls each of the switches $S_1$ through $S_8$ using an algorithm in the form of a computer program or algorithm stored in a memory of the controller 110, for example. The discharge control module 206 may be operatively coupled with one or more sensors implemented with the capacitor 106 which detects the voltage level and/or temperature of the capacitor 106 at any time during the operation of the inverter system 200. The load 102 may refer to any suitable electric machine which uses AC voltage to operate, such as motor and/or generator. In some examples, the motor may be an interior permanent magnet (IPM) motor. For simplicity, some components such as inductors, additional resistors/capacitors, and/or additional sensors are not shown in the figure.

Figure 3:
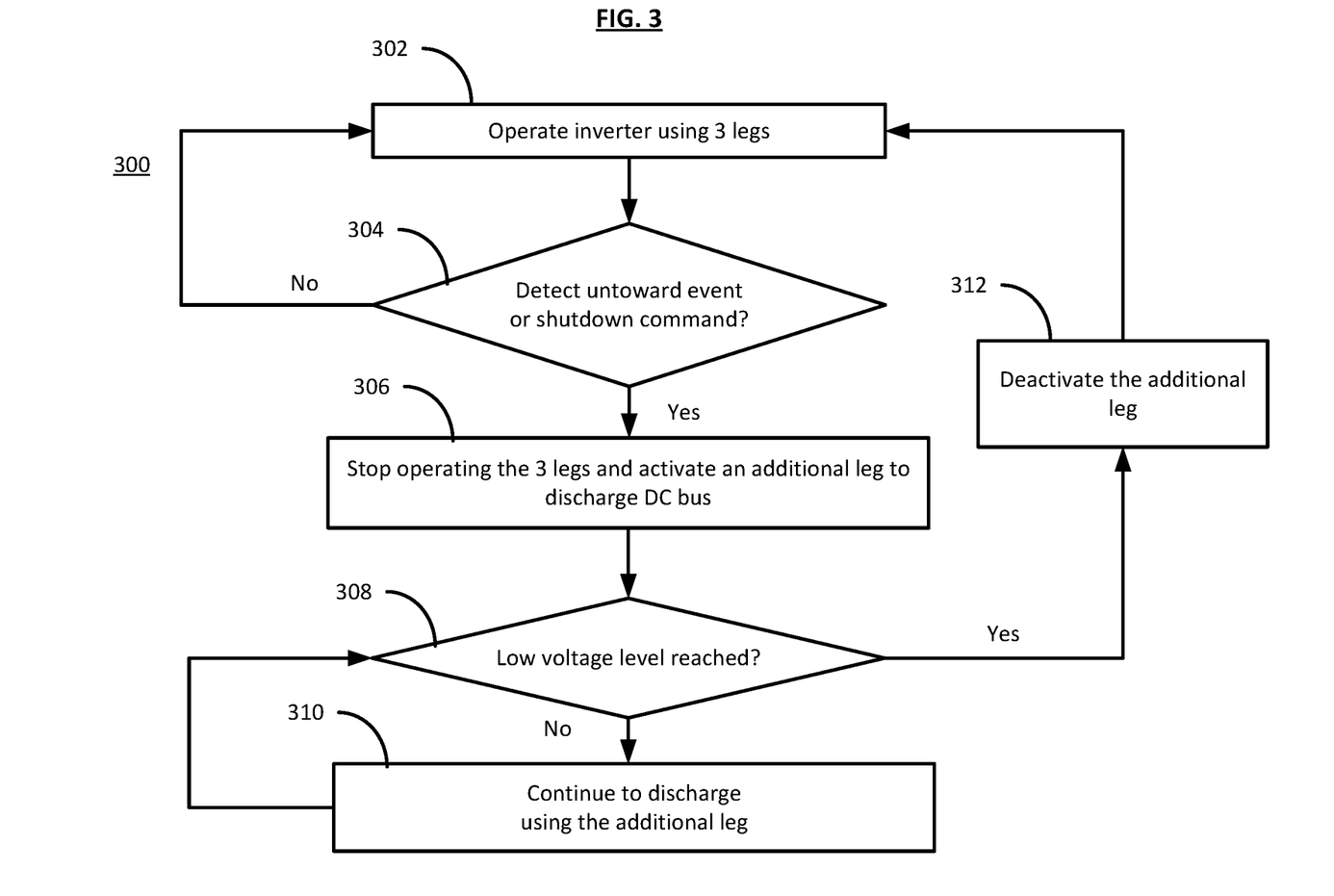
FIG. 3 is a flow chart of a transition algorithm used in operating the inverter by determining when to activate or deactivate the auxiliary leg in accordance with embodiments of the present disclosure.

FIG. 3 shows an algorithm or method 300 with which the controller may control the discharge of the capacitor in the inverter system as disclosed herein. In step 302 of the algorithm, the controller 110 operates the inverter 202 using the three legs 202A through 202C. In step 304, the controller 110 decides if there is an "untoward event", which is any event or condition in one or more components of the inverter system that would require the capacitor 106 and/or the DC bus 112 to be discharged, or a shutdown command provided by the system indicating that the system (for example, a vehicle in which the inverter 202 is implemented) needs to be shut down within a certain amount of time.

If the untoward event or the shutdown command is detected, the controller 110 proceeds to step 306 where the three legs 202A through 202C are stopped from operating, and the auxiliary leg 202D is activated to discharge the capacitor 106 and/or the DC bus 112. Then, in step 308, the controller 110 decides if a low voltage level is reached in the capacitor 106 and/or the DC bus 112. This may be determined based on whether the voltage drop across the capacitor 106 or the DC bus 112 is measured to be reduced to below a lower voltage threshold. The lower voltage threshold in some examples is 60V. If so, the auxiliary leg 202D is deactivated in step 312 and the inverter 202 is allowed to operate with the three legs 202A through 202C as in step 302 with the auxiliary leg 202D deactivated. Otherwise, in step 310, the auxiliary leg 202D remains activated to continue discharging.

Figure 4:
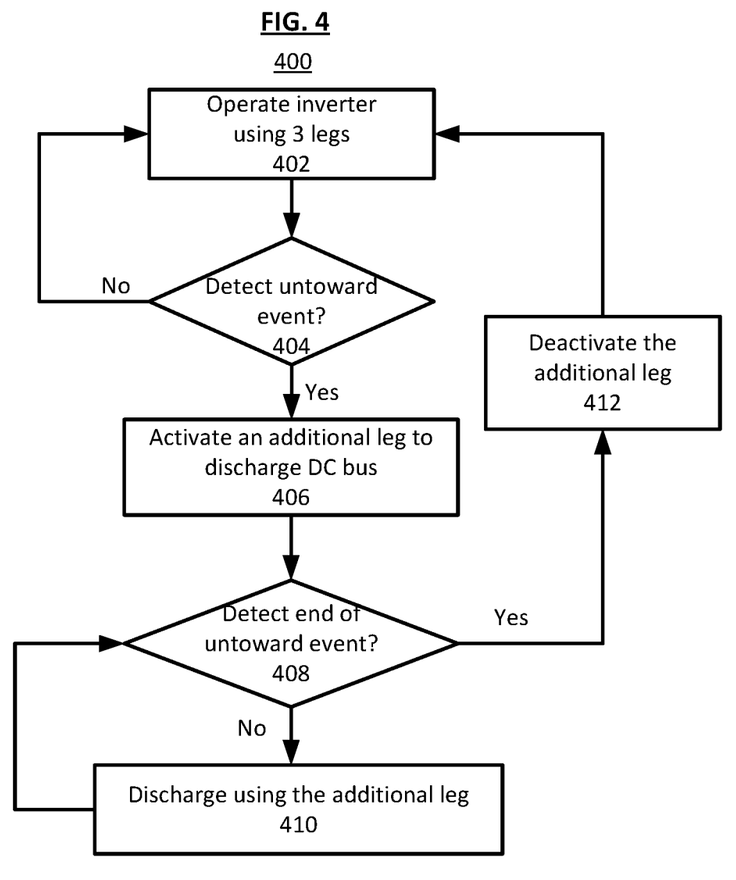
FIG. 4 is a flow chart of a transition algorithm used in operating the inverter by determining when to activate or deactivate the auxiliary leg in accordance with embodiments of the present disclosure.

FIG. 4 shows an algorithm or method 400 with which the controller may control the discharge of the capacitor in the inverter system as disclosed herein. In step 402 of the algorithm, the controller 110 operates the inverter 202 using the three legs 202A through 202C. In step 404, the controller 110 decides if there is the untoward event. If no untoward event is detected, the controller 110 continues to operate the inverter 202 using the three legs.

However, if the untoward event is detected, the controller 110 proceeds to step 406 where the auxiliary leg 202D is activated to discharge the capacitor 106 and/or the DC bus 112. Then, in step 408, the controller 110 decides if the untoward event has ended. This may be determined based on whether the voltage of the capacitor 106 is reduced to a safe voltage level. If so, the auxiliary leg 202D is deactivated in step 412 and the inverter 202 is allowed to operate with the three legs 202A through 202C as in step 402 with the auxiliary leg 202D deactivated. Otherwise, the auxiliary leg 202D remains activated to continue discharging.

Figure 5A:
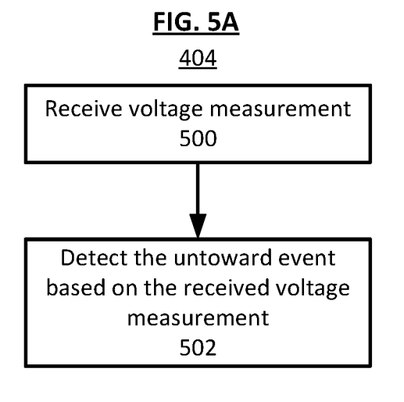
FIG. 5 is a portion of the transition algorithm of FIG. 4, with focus on determining which events correspond to the activating or deactivating of the auxiliary leg in accordance with embodiments of the present disclosure.
Figure 5B:
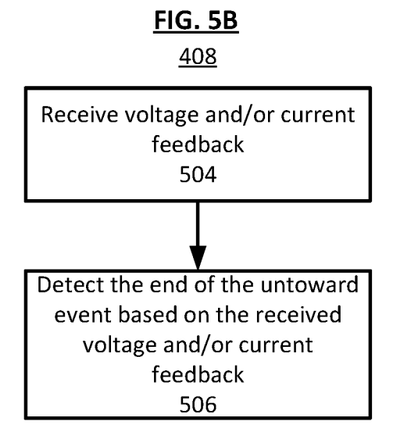

FIGS. 5A and 5B show the process of steps 404 and 408, respectively, in more detail according to some embodiments. The untoward event can be detected by a voltage measurement is above an upper voltage threshold value. In some examples, a voltage feedback and/or a current feedback is an indicator related to an end of the untoward event. In FIG. 5A, step 404 includes step 500 in which the controller 110 receives the voltage measurement from one or more voltage sensor coupled with the capacitor 106 and/or the DC bus 112 which indicates the voltage drop across the component. In a subsequent step 502, the controller 110 detects the untoward event based on the received voltage measurement from step 500.

Figure 6:
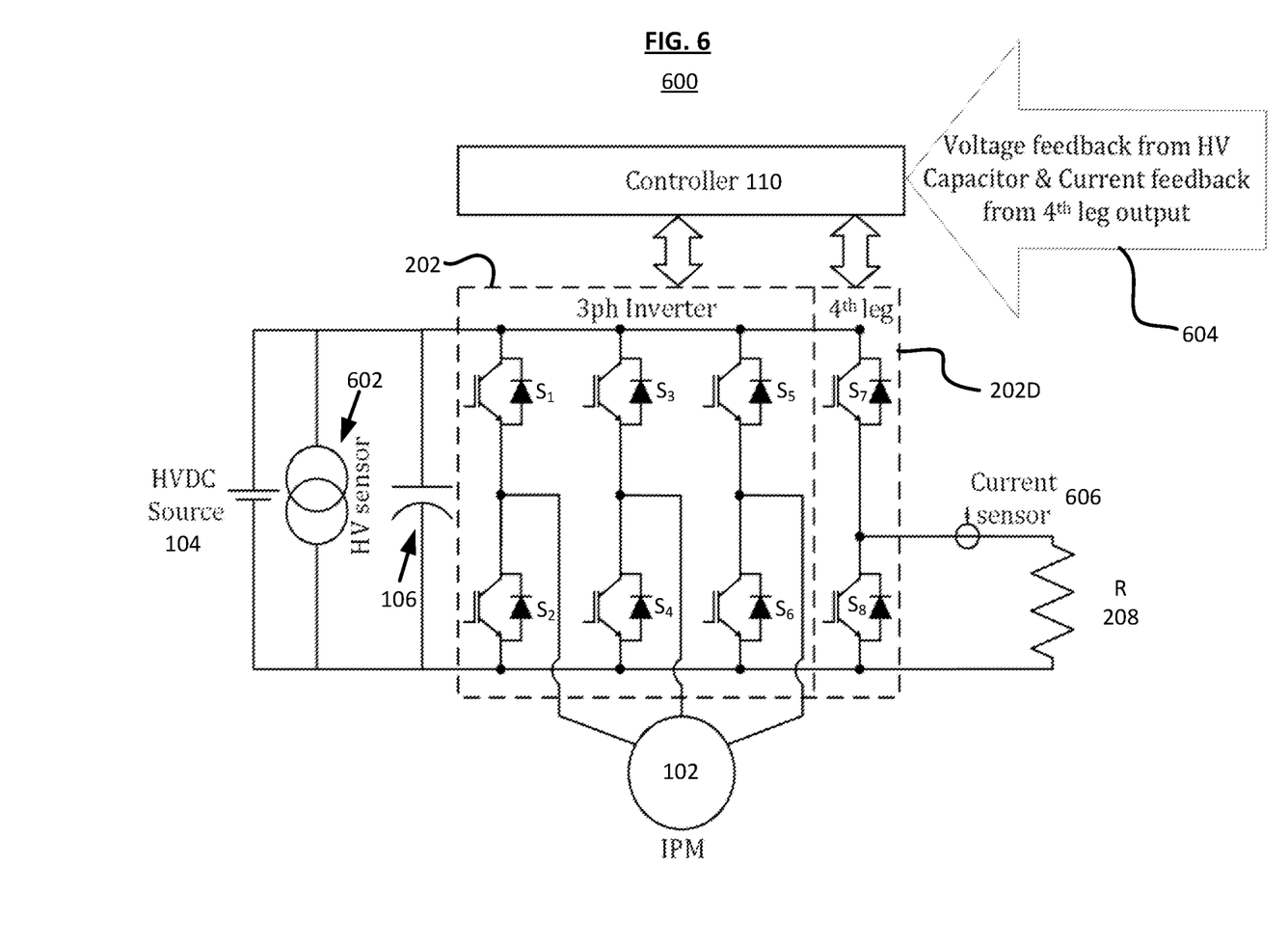
FIG. 6 is a schematic diagram of another inverter system in accordance with embodiments of the present disclosure.

In FIG. 5B, step 408 in some examples includes step 504 in which the controller 110 receives the voltage feedback from a voltage sensor coupled with the capacitor 106 (for example, voltage sensor 602 as shown in FIG. 6) and/or the current feedback from a current sensor coupled with the resistor 208 (for example, current sensor 606 as shown in FIG. 6) when the auxiliary leg is activated to discharge. Then, in step 506, the controller 110 detects the end of the untoward event based on the received voltage and/or current feedback from step 504.

For example, in step 506, the voltage feedback is used to determine whether the capacitor voltage is less than the lower voltage threshold value. In some examples, step 506 involves determining whether the current feedback is less than a current threshold value; if it is, then the voltage drop across the resistor 208 can be calculated. When the discharged voltage is sufficiently low, as determined by the threshold value, the controller proceeds with deactivating the auxiliary leg as in step 412. Otherwise, when more discharging is necessary, the controller 110 proceeds to step 410.

In some examples, the two feedbacks are aggregated or combined into a single feedback signal that includes the voltage and current measurements as suitable, and the controller 110 extracts each feedback from the combined feedback signal to process separately. In some examples, step 408 (e.g., steps 504 and 506 in FIG. 5B) is omitted entirely such that only the step 404 involving detecting the untoward event is implemented, in which case the algorithm or method 400 shown in FIG. 4 proceeds from step 406 directly to step 412 after a certain time has passed (i.e., a time delay) as determined by the RC time constant of the RC circuit.

FIG. 6 shows an example of an inverter system 600 as disclosed herein, where a voltage sensor 602 is installed at the DC bus 112 to measure the voltage drop across the capacitor 106. The controller 110 in this example is configured to receive feedback 604 from (a) the capacitor 106 and/or (b) a current sensor 606 electrically coupled with the resistor 208. In this example, the feedback 604 includes voltage feedback from the capacitor and/or the current feedback from the current sensor 606. The capacitor, voltage source, and voltage sensor may all be high-voltage (HV) to accommodate a higher level of voltage. The inverter system 600 also includes two switches $S_7$ and $S_8$ in the auxiliary leg 202D.

Similar to the other pairs of switches in the three-phase inverter 202 as previously mentioned, the switches $S_7$ and $S_8$ are complementary to each other such that when one of them is closed, the other is open. Therefore, when the switch $S_7$ is closed to form a closed loop with the capacitor 106 for discharging, the other switch $S_8$ of the same leg is open such that the current flows through the resistor 208, thereby discharging the capacitor 106. Alternatively, when the switch $S_7$ is open, the other switch $S_8$ is closed, but since the circuit is opened because of the switch $S_7$, whether the switch $S_8$ is open or closed has no effect on the overall performance of the system 600. In some examples, the resistor 208 is also used to control a charging current for the battery during regeneration (that is, regenerative braking) by controlling voltage across the DC bus 112.

Additionally, the DC bus voltage can be regulated through a closed loop control of the auxiliary leg 202D to dissipate the excess energy through the resistor 208. The switch(es) of the auxiliary leg 202D can be modulated to achieve the regulation operation. In some examples, the control loop regulates the DC bus voltage using a reference set by the voltage source 104 (e.g., a battery), and the feedback is obtained through the DC bus voltage sensor 602. The transfer function would be between the resistor's output current to the DC bus voltage.

In some cases, after a system shutdown (emergency or non-emergency), high voltage on the DC bus has to be discharged down to a lower level, such as below 60V, after the input contactors open for safety purposes. In some examples, this is achieved passively through a resistor with a large resistance, and the discharge happens over a relatively long period of time, such as in several minutes. Such implementation is shown in FIG. 6, with a feedback system 900 shown in FIG. 9, and a corresponding algorithm or method 1000 used therein is described in FIG. 10. During service or emergency, however, there is a need to discharge the capacitor in a shorter period of time, such as within a few seconds. In some examples, this is achieved using a smaller resistor and a switch or contactor. The active discharge implementation is described in FIG. 7, and an algorithm or method 1100 used therein is described in FIG. 11.

Figure 7:
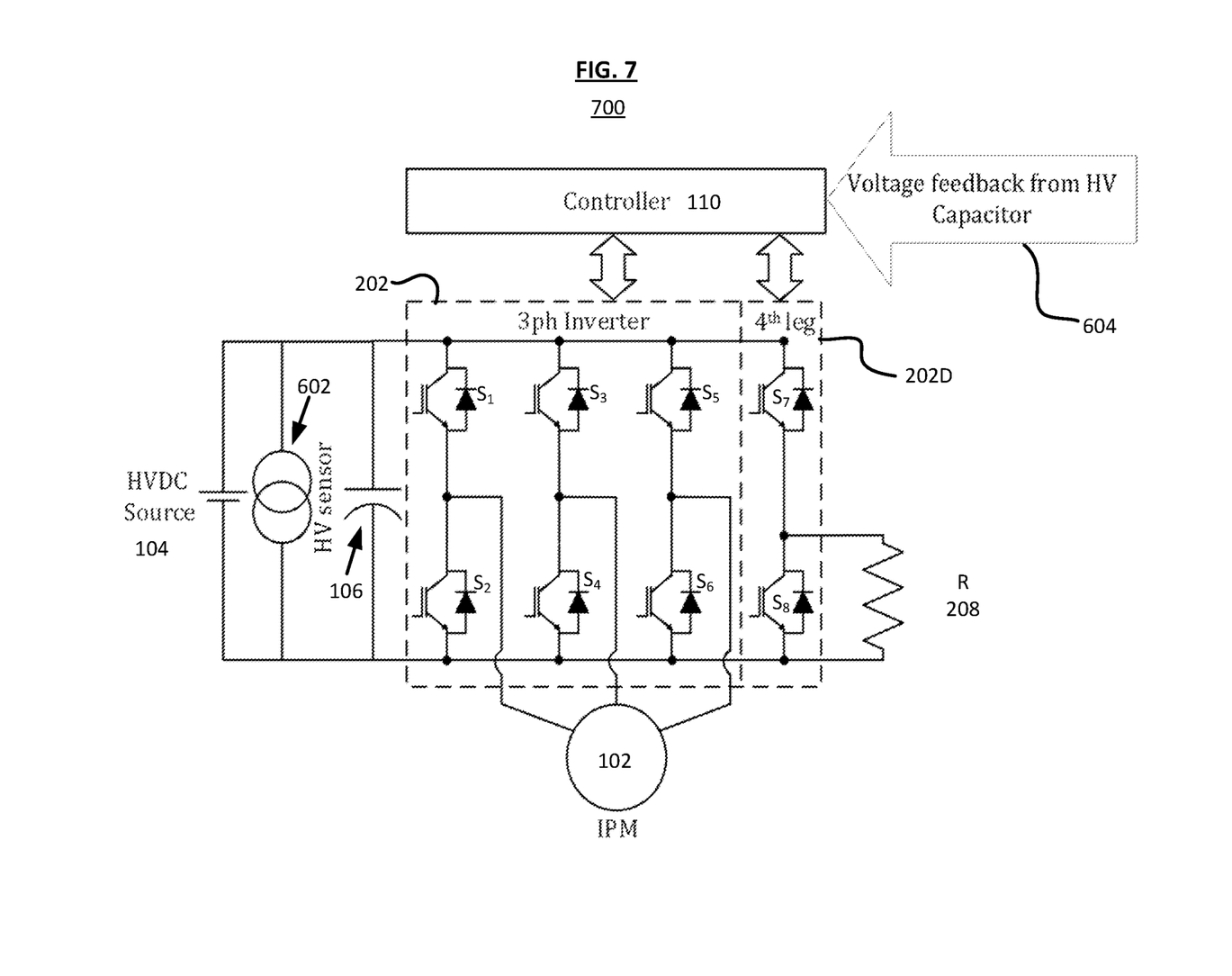
FIG. 7 is a schematic diagram of another inverter system in accordance with embodiments of the present disclosure.

FIG. 7 shows another example of an inverter system 700 as disclosed herein. The inverter system 700 share similar components as the inverter system 600 but differs in that the current sensor 606 is removed from the auxiliary leg 202D. The lack of current sensor 606 causes the controller 110 to determine whether or not to activate the auxiliary leg 202D based on the voltage feedback 604 from the capacitor 106. Active discharge is implemented using the motor windings or using a separate circuitry with a switch and a resistor. In the inverter system 700 as disclosed herein, the active discharge is made possible using the auxiliary leg 202D without relying on the motor windings or the separate circuitry. In some examples, the switch $S_7$ of the auxiliary leg 202D is used to actively discharge the DC bus through the resistor 208 by closing the same after the contactors open, and the switch $S_7$ remains closed until the voltage falls below a certain voltage threshold, such as 60V for example. In FIGS. 6 and 7, although the switches are shown as IGBTs with body diode, gate, collector and emitter, this is for illustrative purposes only; any suitable type of switch may be used as known in the art.

Figure 8:
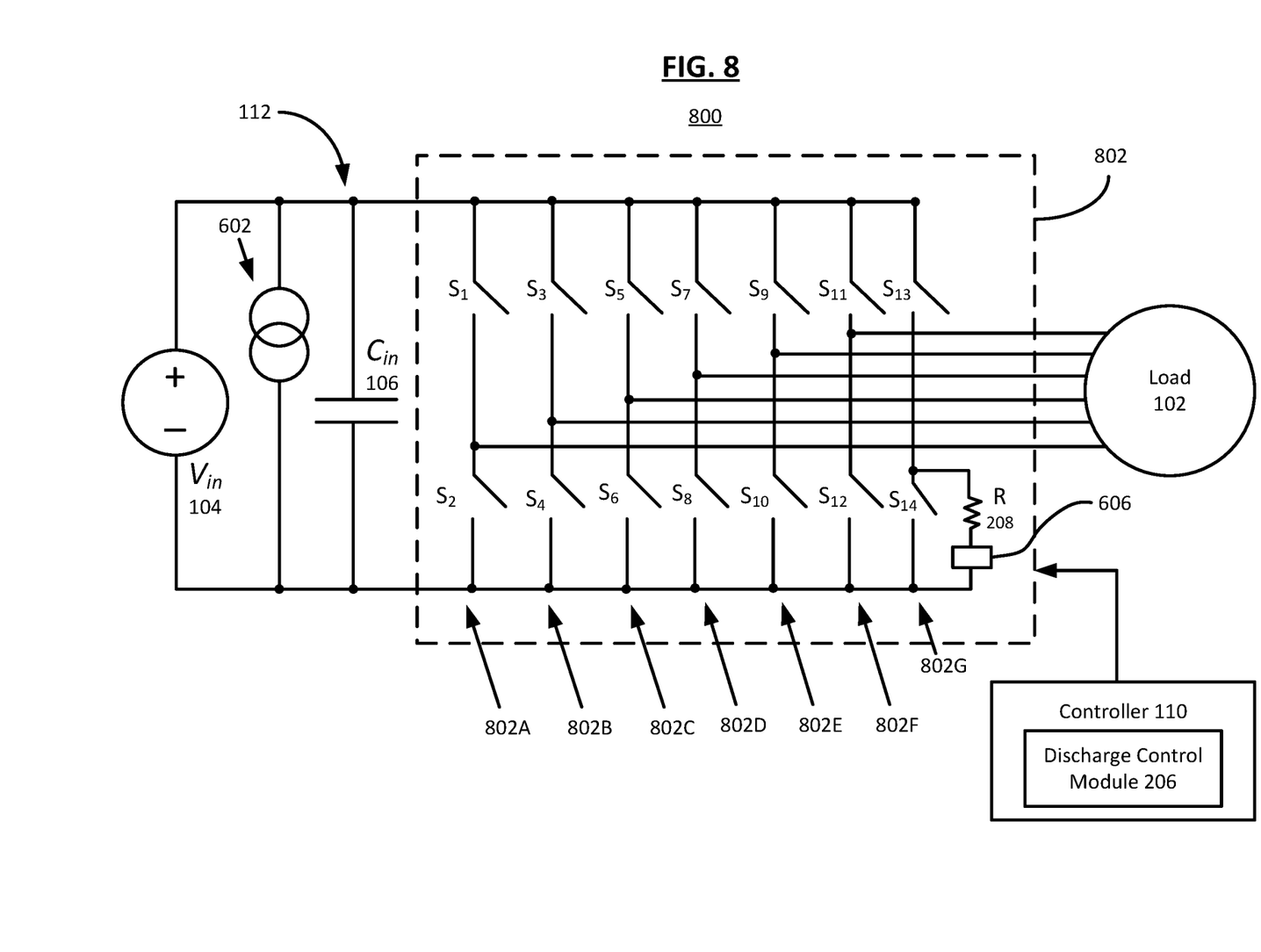
FIG. 8 is a schematic diagram of a six-phase inverter system in accordance with embodiments of the present disclosure.

FIG. 8 shows yet another example of an inverter system 800 as disclosed herein, where instead of a three-phase inverter 202, there is a six-phase inverter 802 (with six corresponding legs 802A through 802F) implemented with an additional, auxiliary leg 802G. The auxiliary leg 802G operates in the same way as the auxiliary leg 202D in the previous examples, the difference being the controller 110, or more specifically the discharge control module 206, must determine the timing of activating or deactivating the switches $S_{13}$ and $S_{14}$ of the auxiliary leg 802G based on how the six-phase inverter 802 (which uses the switches $S_1$ through $S_{12}$) operates.

Although not illustrated in the figures, any number of auxiliary legs may be implemented so long as the discharge control module 206 has an operation schedule suitable for the number of legs being implemented, or the controller 110 is capable of determining which of the auxiliary leg or legs to activate and deactivate. In some examples, each of the auxiliary leg is coupled with one or more resistor. If there are multiple resistors, they may be aligned in series or parallel with each other. If there are multiple auxiliary legs, each of the resistor may have the same or different resistance, as suitable. If there are multiple auxiliary legs, each of the legs may be activated separately or together by the control module 206. Other suitable configurations and implementations may be achieved based upon the disclosure herein.

Figure 9:
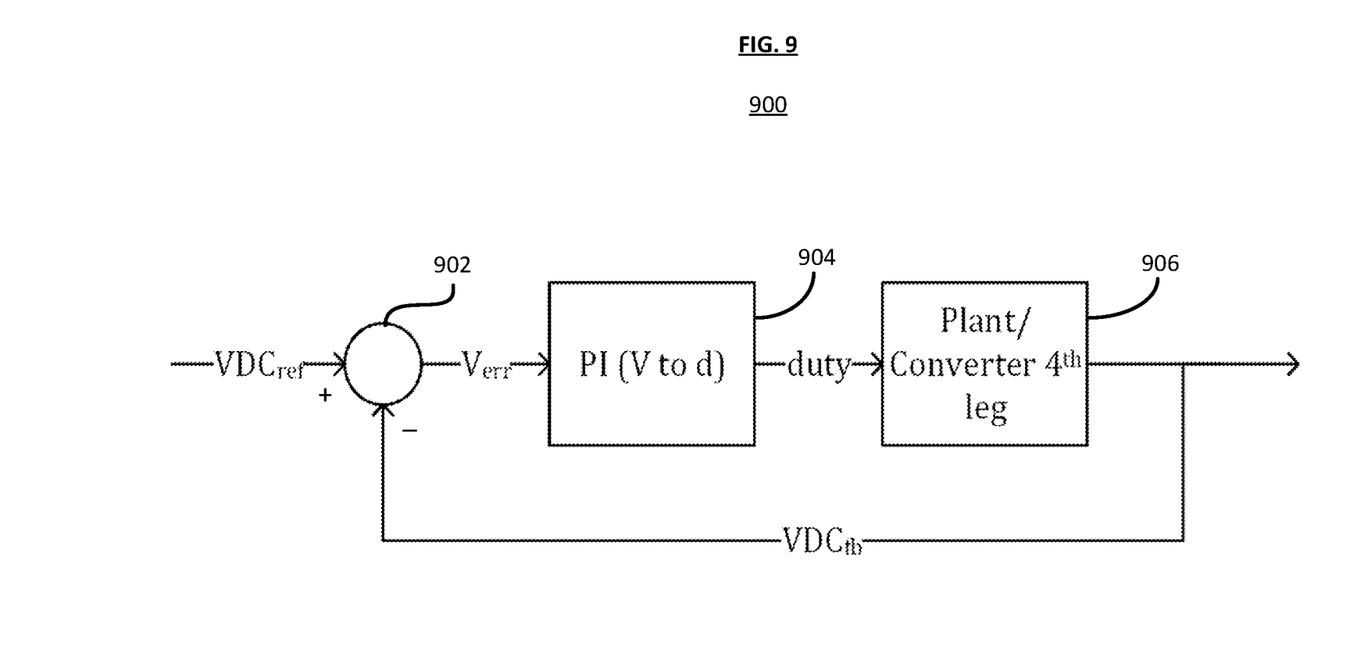
FIG. 9 is a block diagram of a feedback loop system in accordance with embodiments of the present disclosure.

FIG. 9 shows an example of a feedback loop or feedback system 900 implemented in some of the embodiments as disclosed herein. Initially, a reference DC voltage ($VDC_{ref}$), for example of the DC bus or the capacitor as previously disclosed, is inputted into a proportional-integral (PI) controller 904 to convert the input voltage to a duty factor (duty) to be inputted into a plant/converter auxiliary leg controller 906 (the auxiliary leg may be the $4^{th}$ leg or the $7^{th}$ leg, for example, depending on the type of inverter that is used). When the auxiliary leg controller 906 activates the auxiliary leg to begin dissipating voltage from the corresponding capacitor, measurement is taken of the remaining DC voltage. After the DC voltage measurement is taken, this measurement is provided as a feedback DC voltage ($VDC_{fb}$) into a summing point 902 which subtracts the feedback DC voltage from the reference DC voltage to determine the error voltage ($V_{err}$) which is used by the PI controller 904 to determine whether the auxiliary leg is to remain activated.

Figure 10:
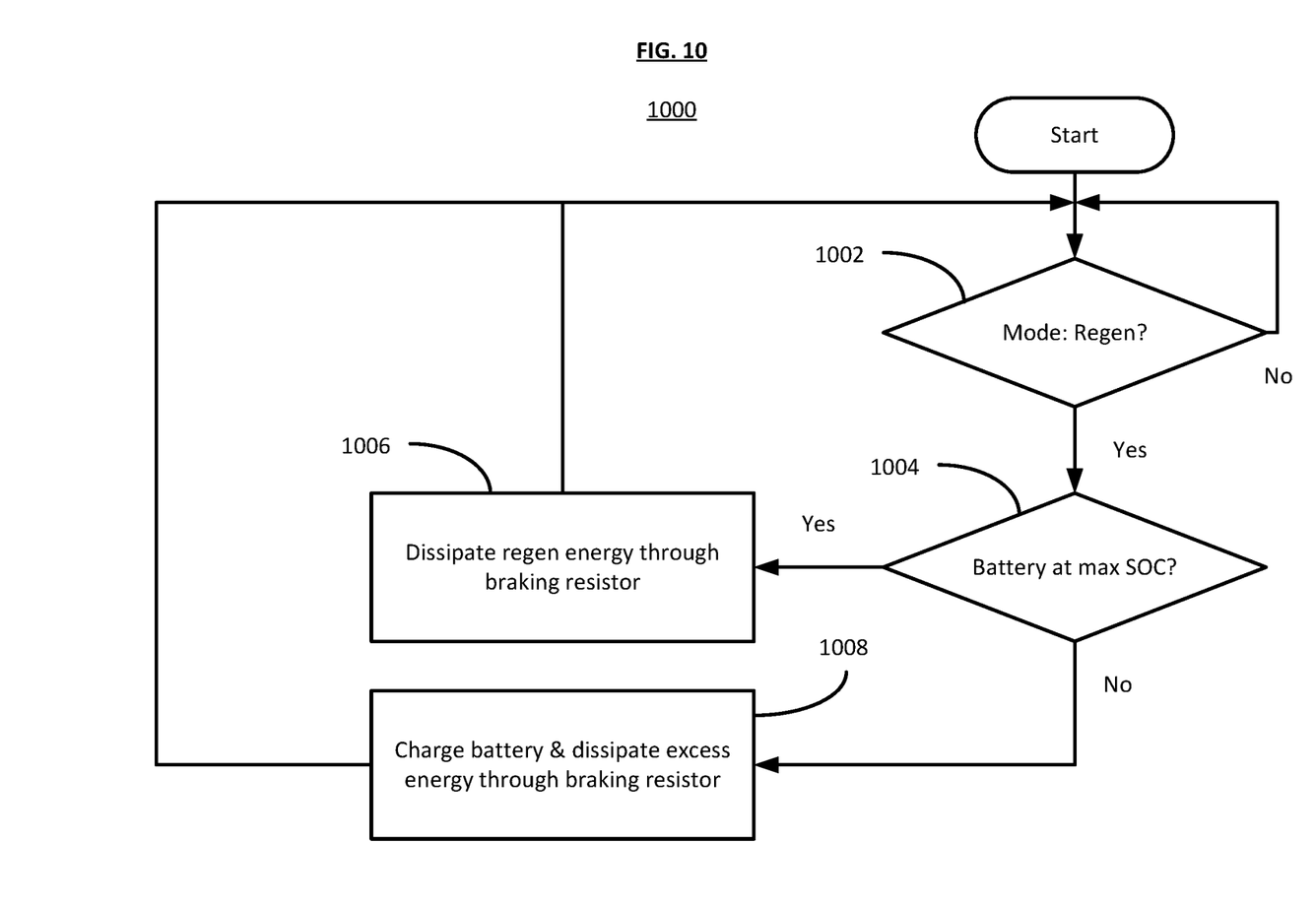
FIG. 10 is a flow chart for controlling battery charging during regenerative braking in accordance with embodiments of the present disclosure.

FIG. 10 shows a flow diagram of an algorithm or method 1000 implemented by the controller in some examples. In step 1002, the controller determines if a regenerative braking mode of the vehicle is activated. When the regeneration braking is confirmed to be activated, in step 1004, the controller determines if the SOC of the vehicle battery is at or above a maximum allowed SOC (or, an upper SOC threshold) as determined by the controller, the user, or the manufacturer of the battery, as suitable. If the battery SOC is at or above the maximum SOC level, in step 1006, the controller causes the auxiliary leg to be activated, thereby dissipating through the braking resistor all of the energy obtained by regenerative braking. Otherwise, if the battery SOC is below the maximum SOC level, in step 1008, the controller permits the battery to charge, and any excess energy obtained from the regenerative braking is dissipated through the braking resistor.

Figure 11:
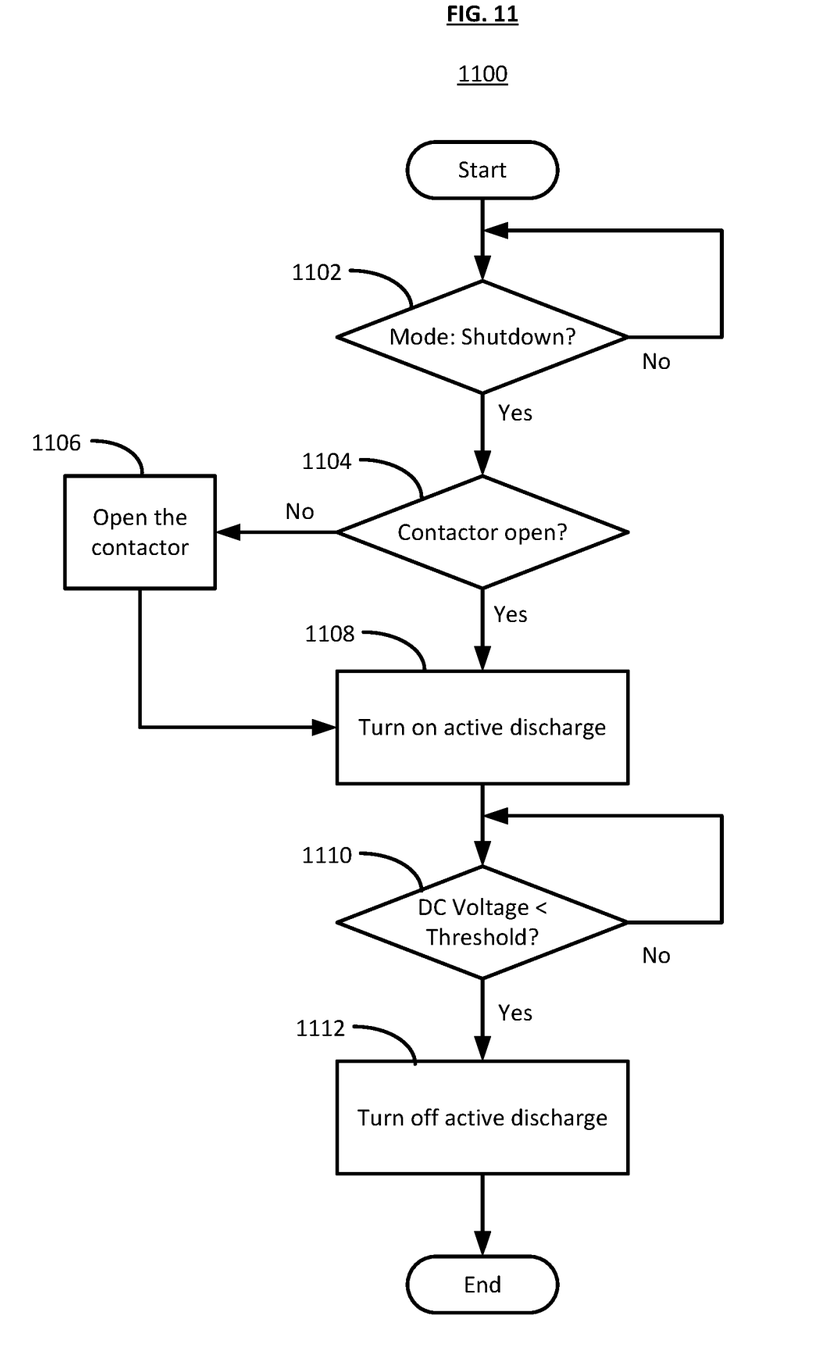
FIG. 11 is a flow chart for enabling active discharge of the DC bus or capacitor during shutdown in accordance with embodiments of the present disclosure.

FIG. 11 shows another flow diagram of an algorithm or method 1100 implemented by the controller in some examples. In step 1102, the controller determines if a shutdown mode of the vehicle is activated. If the shutdown mode is activated, in step 1104, the controller determines if the contactor of the battery is open (that is, whether the battery is still providing energy to the capacitor). If the contactor is closed, the controller opens the contactor in step 1106 to prevent further energy from being provided to the capacitor. Otherwise, if the contactor is open, in step 1108, the controller turns on the active discharge, where the auxiliary leg 202D is used as described herein to discharge the DC voltage from the capacitor. In step 1110, the controller determines if the DC voltage in the DC bus or the capacitor is below a lower voltage threshold. In some examples, the lower voltage threshold is 60V. If the lower voltage threshold is not reached, the controller maintains the active discharge. Otherwise, if the lower voltage threshold is reached, the controller may turn off the active discharge in step 1112 by deactivating the auxiliary leg.

Advantages in having one or more legs in addition to the three that are being used in discharging the DC bus and/or capacitor is that doing so improves safety and reliability of the inverter system as whole. In electric powertrains, there are periods of power regeneration from the motor back to the DC bus, and some periods of power regeneration could be long enough to charge the DC bus beyond the allowable voltage limit, since the battery is already at full charge (SOC). During these periods, the DC bus voltage needs to be regulated to protect the capacitors and avoid voltage runoff to higher values. When a capacitor has more than the rated voltage applied to it, the overvoltage may cause swelling of the capacitor case and leakage of the electrolyte in the case of a capacitor with an electrolyte such as aluminum electrolytic capacitors. The capacitor may also overheat and fail.

In view of the above, exposing capacitors to more than their rated voltage should be prevented, and for capacitor to be used over an extended period of time, in some cases, it is not recommended to expose it to more than 80% of its rated voltage, although in some examples, the percentage may be greater or less in view of the usage of application of the inverter. The correct voltage rating may be supplied by the manufacturer of the capacitor. Furthermore, the use of an auxiliary leg implemented in the inverter to control such discharging allows for a reduction in size and cost of the inverter system, since there is no need to implement an auxiliary switch and circuitry which are separate and independently operated from the inverter to control the discharging. In some examples, the size of the entire vehicle system may be reduced by allowing undersizing of battery, since the excess energy can be discharged.

In some examples, the inverter systems as disclosed herein are used in applications of a wide power range, from tens to hundreds of kilowatt power. The inverter systems in some examples are implemented in powertrain and/or power system applications. Furthermore, in electric powertrains, for example, there are periods of power regeneration achieved from the motor back to the DC bus. Some periods of power regeneration may be long enough to charge the DC bus beyond the allowable voltage limit since the battery is already at a full state of charge (SOC). During these periods, the DC bus voltage needs to be regulated to protect the capacitors and avoid voltage runoff to higher values. As such, using the auxiliary leg of an inverter helps regulate and protect the capacitors to avoid such voltage runoffs.

It is to be understood that the above description is intended to be illustrative, and not restrictive. Many other embodiments will be apparent to those of skill in the art upon reading and understanding the above description. For example, it is contemplated that features described in association with one embodiment are optionally employed in addition or as an alternative to features described in association with another embodiment. The scope of the present disclosure should, therefore, be determined with reference to the appended claims, along with the full scope of equivalents to which such claims are entitled.

What is claimed is:

1. An inverter system comprising:
a direct-current (DC) bus;
a capacitor electrically coupled with the DC bus;
a first sensor configured to detect a voltage drop across mature of the capacitor;
an inverter electrically coupled with the capacitor or the DC bus, the inverter comprising a plurality of legs, each leg including two switches operating complementary to each other, an auxiliary leg comprising a pair of auxiliary switches, and a resistor coupled parallel to one of the auxiliary switches;
a second sensor configured to detect a current through the resistor, and
a controller operatively coupled with the inverter and configured to:
in response to the voltage drop across the capacitor being greater than an upper voltage threshold value, operate the auxiliary leg of the inverter using a duty factor associated with the auxiliary leg to begin discharging of the capacitor or the DC bus through the resistor;
adjust the duty factor associated with the auxiliary leg using a feedback system based on a feedback voltage measurement indicating the voltage across the capacitor is less than the upper voltage threshold value and greater than a lower voltage threshold value;
operate the auxiliary leg using the adjusted duty factor associated with the auxiliary leg; and
deactivate the auxiliary leg in response to the voltage drop across the capacitor being less than the lower voltage threshold value and the current detected through the resistor being less than a lower current threshold value.

2. The inverter system of claim 1, wherein the inverter comprises a plurality of auxiliary legs, each including a corresponding pair of auxiliary switches, and at least one corresponding resistor each coupled to the auxiliary switch in one of the auxiliary legs.

3. The inverter system of claim 1, wherein the inverter is a three-phase inverter, the plurality of legs are three (3) legs, and the auxiliary leg is a fourth ($4^{th}$) leg.

4. The inverter system of claim 1, wherein the inverter is a six-phase inverter, the plurality of legs are six (6) legs, and the auxiliary leg is a seventh ($7^{th}$) leg.

5. The inverter system of claim 4, further comprising an eighth ($8^{th}$) leg, the $8^{th}$ leg being an additional auxiliary leg.

6. A method of operating an inverter system, the inverter system comprising: a direct-current (DC) bus, a capacitor electrically coupled with the DC bus, an inverter electrically coupled with the capacitor or the DC bus, the inverter comprising a plurality of legs, each leg including two switches operating complementary to each other, an auxiliary leg comprising a pair of auxiliary switches, a resistor coupled parallel to one of the auxiliary switches, and a controller operatively coupled with the inverter to control operation of the auxiliary leg of the inverter, the method comprising:
in response to a voltage drop across the capacitor being greater than an upper voltage threshold value, operating, by the controller using a duty factor associated with the auxiliary leg in response to detecting an untoward event, the auxiliary leg to begin discharging the capacitor or the DC bus through the resistor, adjusting, by the controller based on a feedback voltage measurement indicating the voltage drop across the capacitor is less than the upper voltage threshold value and greater than a lower voltage threshold value, the duty factor associated with the auxiliary leg using a feedback system;

operating, by the controller using the adjusted duty factor associated with the auxiliary leg, the auxiliary leg; and deactivating the auxiliary leg in response to the voltage drop across the capacitor being less than the lower voltage threshold value and a current through the resistor being less than a lower current threshold value.

7. The method of claim 6, wherein activating the auxiliary leg regulates voltage to protect a DC power source from overcharging the DC bus or the capacitor by controlling a charging current or a DC voltage.

8. The method of claim 6, wherein the inverter comprises a plurality of auxiliary legs, each including a corresponding auxiliary switch and at least one corresponding resistor.

9. The method of claim 6, wherein the inverter is a three-phase inverter, the plurality of legs are three (3) legs, and the auxiliary leg is a fourth ($4^{th}$) leg.

10. The method of claim 6, wherein the inverter is a six-phase inverter, the plurality of legs are six (6) legs, and the auxiliary leg is a seventh ($7^{th}$) leg.

11. An inverter electrically coupled with a capacitor, the inverter comprising:
- a plurality of legs, each leg including two switches operating complementary to each other;
- an auxiliary leg comprising a pair of auxiliary switches; and
- a resistor coupled parallel to one of the auxiliary switches, the inverter is configured to:
  - operate the auxiliary leg based on a received signal indicating a voltage drop across the capacitor is greater than an upper voltage threshold value, the signal including a duty factor associated with the auxiliary leg, to begin discharging the capacitor through the resistor;
  - in response to receiving an updated signal including an adjusted duty factor associated with the auxiliary leg, operate the auxiliary leg using the adjust duty factor associated with the auxiliary leg, the updated signal being based on a feedback voltage measurement indicating the voltage drop across the capacitor is less than the upper voltage threshold value and greater than a lower voltage threshold value; and
  - deactivate the auxiliary leg in response to the updated signal indicating the voltage drop across the capacitor is less than the lower voltage threshold value and a current through the resistor is less than a lower current threshold value.

12. An inverter system comprising:
an inverter comprising:
- a plurality of legs, each leg including two switches operating complementary to each other,
- an auxiliary leg comprising a pair of auxiliary switches, and
- a resistor coupled parallel to one of the auxiliary switches;

a capacitor electrically coupled with the inverter; and a controller operatively coupled with the inverter and configured to:
- in response to a voltage drop across the capacitor being greater than an upper voltage threshold value operate the auxiliary leg of the inverter using a duty factor associated with the auxiliary leg to begin discharging of the capacitor through the resistor;
- adjust the duty factor associated with the auxiliary leg using a feedback system based on a feedback voltage measurement indicating the voltage drop across the capacitor is less than the upper voltage threshold value and greater than a lower voltage threshold value;
- operate the auxiliary leg using the adjusted duty factor associated with the auxiliary leg; and
- deactivate the auxiliary leg in response to the voltage drop across the capacitor being less than the lower voltage threshold value and a current through the resistor being less than a lower current threshold value.

13. An inverter system comprising:
an inverter comprising:
- a plurality of legs, each leg including two switches operating complementary to each other,
- an auxiliary leg comprising a pair of auxiliary switches, and
- a resistor coupled parallel to one of the auxiliary switches;

a capacitor electrically coupled with the inverter; and a controller operatively coupled with the inverter and comprising a feedback system, the feedback system including a proportional-integral (PI) controller, the controller configured to:
- in response to a voltage drop across the capacitor being greater than an upper voltage threshold value, operate the auxiliary leg of the inverter using a duty factor associated with the auxiliary leg to begin discharging of the capacitor through the resistor;
- adjust the duty factor associated with the auxiliary leg using the PI controller based on a feedback voltage measurement indicating the voltage drop across the is less than the upper voltage threshold value and greater than a lower voltage threshold value;
- operate the auxiliary leg using the adjusted duty factor associated with the auxiliary leg; and
deactivate the auxiliary leg in response to the voltage drop across the capacitor being less than the lower voltage threshold value and a cu rent thro b the resistor being less than a lower current threshold value.

\* \* \* \* \*